United States Patent
Kesin et al.

(10) Patent No.: US 11,093,687 B2
(45) Date of Patent: *Aug. 17, 2021

(54) SYSTEMS AND METHODS FOR IDENTIFYING KEY PHRASE CLUSTERS WITHIN DOCUMENTS

(71) Applicant: Palantir Technologies Inc., Palo Alto, CA (US)

(72) Inventors: Max Kesin, Woodmere, NY (US); Hem Wadhar, New York, NY (US)

(73) Assignee: Palantir Technologies Inc., Denver, CO (US)

( * ) Notice: Subject to any disclaimer, the term of this patent is extended or adjusted under 35 U.S.C. 154(b) by 365 days.

This patent is subject to a terminal disclaimer.

(21) Appl. No.: 16/211,123

(22) Filed: Dec. 5, 2018

(65) Prior Publication Data

US 2019/0114309 A1 Apr. 18, 2019

Related U.S. Application Data

(63) Continuation of application No. 15/293,140, filed on Oct. 13, 2016, now Pat. No. 10,180,929, which is a
(Continued)

(51) Int. Cl.
*G06F 16/20* (2019.01)
*G06F 40/106* (2020.01)
(Continued)

(52) U.S. Cl.
CPC .......... *G06F 40/106* (2020.01); *G06F 3/0481* (2013.01); *G06F 16/345* (2019.01);
(Continued)

(58) Field of Classification Search
CPC .... G06F 16/353; G06F 16/345; G06F 40/106; G06F 40/205; G06F 40/117; G06F 3/0481
See application file for complete search history.

(56) References Cited

U.S. PATENT DOCUMENTS

| 5,978,475 A | 11/1999 | Schneier et al. |
| 6,003,040 A | 12/1999 | Mital et al. |

(Continued)

FOREIGN PATENT DOCUMENTS

| CN | 101729531 | 6/2010 |
| CN | 103281301 | 9/2013 |

(Continued)

OTHER PUBLICATIONS

U.S. Pat. No. 9,535,974, Systems and Methods for Identifying Key Phrase Clusters Within Documents, Jan. 3, 2017.
(Continued)

*Primary Examiner* — Tarek Chbouki
(74) *Attorney, Agent, or Firm* — Knobbe Martens Olson & Bear LLP (57) ABSTRACT

Systems and methods are disclosed for key phrase clustering of documents. In accordance with one implementation, a method is provided for key phrase clustering of documents. The method includes obtaining a first plurality of documents based at least on a user input, obtaining a statistical model based at least on the user input, and obtaining, from content of the first plurality of documents, a plurality of segments. The method also includes identifying a plurality of clusters of segments from the plurality of segments, determining statistical significance of the plurality of clusters based at least on the statistical model and the content, and providing for display a representative cluster from the plurality of tokens, the representative cluster being determined based at least on the statistical significance. The method further includes determining a label for the representative cluster based at least on the plurality of clusters and the statistical significance.

20 Claims, 6 Drawing Sheets

Related U.S. Application Data continuation of application No. 14/581,920, filed on Dec. 23, 2014, now Pat. No. 9,535,974, which is a continuation-in-part of application No. 14/319,765, filed on Jun. 30, 2014, now Pat. No. 9,619,557.

(51) Int. Cl.
*G06F 16/34* (2019.01)
*G06F 16/35* (2019.01)
*G06F 40/117* (2020.01)
*G06F 40/205* (2020.01)
*G06F 3/0481* (2013.01)

(52) U.S. Cl.
CPC .......... *G06F 16/353* (2019.01); *G06F 40/117* (2020.01); *G06F 40/205* (2020.01)

(56) References Cited

U.S. PATENT DOCUMENTS

| | | | |
|---|---|---|---|
| 6,253,203 B1 | 6/2001 | O'Flaherty et al. | |
| 6,385,619 B1 | 5/2002 | Eichstaedt et al. | |
| 6,725,240 B1 | 4/2004 | Asad et al. | |
| 6,807,569 B1 | 10/2004 | Bhimani et al. | |
| 6,906,717 B2 | 6/2005 | Couckuyt et al. | |
| 7,017,046 B2 | 3/2006 | Doyle et al. | |
| 7,069,586 B1 | 6/2006 | Winneg et al. | |
| 7,213,205 B1 * | 5/2007 | Miwa ..................... | G06F 16/93 715/234 |
| 7,225,468 B2 | 5/2007 | Waisman et al. | |
| 7,426,507 B1 | 9/2008 | Patterson | |
| 7,461,077 B1 | 12/2008 | Greenwood | |
| 7,496,567 B1 | 2/2009 | Steichen | |
| 7,770,032 B2 | 8/2010 | Nesta et al. | |
| 7,774,431 B2 | 8/2010 | Conn et al. | |
| 7,801,871 B2 | 9/2010 | Gosnell | |
| 8,037,046 B2 | 10/2011 | Udezie et al. | |
| 8,181,253 B1 | 5/2012 | Zaitsev et al. | |
| 8,190,893 B2 | 5/2012 | Benson et al. | |
| 8,239,668 B1 | 8/2012 | Chen et al. | |
| 8,375,141 B2 | 2/2013 | Rowstron et al. | |
| 8,386,377 B1 | 2/2013 | Xiong et al. | |
| 8,423,909 B2 | 4/2013 | Zabielski | |
| 8,683,322 B1 | 3/2014 | Cooper | |
| 8,769,412 B2 | 7/2014 | Gill et al. | |
| 8,782,794 B2 | 7/2014 | Ramcharran | |
| 8,786,605 B1 | 7/2014 | Curtis et al. | |
| 8,806,355 B2 | 8/2014 | Twiss et al. | |
| 8,931,043 B2 | 1/2015 | Cooper et al. | |
| 9,049,117 B1 | 6/2015 | Nucci et al. | |
| 9,111,281 B2 | 8/2015 | Stibel et al. | |
| 9,135,233 B2 | 9/2015 | Fan et al. | |
| 9,335,897 B2 | 5/2016 | Goldenberg | |
| 9,338,013 B2 | 5/2016 | Castellucci et al. | |
| 9,535,974 B1 | 1/2017 | Kesin et al. | |
| 9,619,557 B2 | 4/2017 | Kesin et al. | |
| 9,645,727 B2 | 5/2017 | Devarajan et al. | |
| 9,875,293 B2 | 1/2018 | Chakerian et al. | |
| 9,881,074 B2 | 1/2018 | Chakerian et al. | |
| 10,162,887 B2 | 12/2018 | Kesin et al. | |
| 10,180,929 B1 | 1/2019 | Kesin et al. | |
| 10,356,032 B2 | 7/2019 | White | |
| 2002/0029248 A1 | 3/2002 | Cook et al. | |
| 2002/0112157 A1 | 8/2002 | Doyle et al. | |
| 2003/0055830 A1 | 3/2003 | Gutierrez-Rivas et al. | |
| 2004/0123139 A1 | 6/2004 | Aiello et al. | |
| 2004/0160309 A1 | 8/2004 | Stilp | |
| 2004/0181543 A1 | 9/2004 | Wu et al. | |
| 2004/0230577 A1 | 11/2004 | Kawatani | |
| 2004/0250124 A1 | 12/2004 | Chesla et al. | |
| 2005/0021635 A1 | 1/2005 | Graham et al. | |
| 2005/0157662 A1 | 7/2005 | Bingham et al. | |
| 2005/0169274 A1 | 8/2005 | Shuster | |
| 2005/0182764 A1 | 8/2005 | Evans | |
| 2005/0204006 A1 | 9/2005 | Purcell et al. | |
| 2005/0204009 A1 | 9/2005 | Hazarika et al. | |
| 2005/0229256 A2 | 10/2005 | Banzhof | |
| 2005/0262556 A1 | 11/2005 | Waisman et al. | |
| 2005/0275638 A1 | 12/2005 | Kolmykov-Zotov et al. | |
| 2006/0026246 A1 | 2/2006 | Fukuhara et al. | |
| 2006/0031928 A1 | 2/2006 | Conley et al. | |
| 2006/0069912 A1 | 3/2006 | Zheng et al. | |
| 2006/0080283 A1 | 4/2006 | Shipman | |
| 2006/0080616 A1 | 4/2006 | Vogel et al. | |
| 2006/0168066 A1 | 7/2006 | Helsper et al. | |
| 2006/0179003 A1 | 8/2006 | Steele et al. | |
| 2006/0212931 A1 | 9/2006 | Shull et al. | |
| 2006/0265747 A1 | 11/2006 | Judge | |
| 2007/0112867 A1 | 5/2007 | Evans et al. | |
| 2007/0143851 A1 | 6/2007 | Nicodemus | |
| 2007/0162454 A1 | 7/2007 | D'Albora et al. | |
| 2007/0192122 A1 | 8/2007 | Routson et al. | |
| 2007/0294766 A1 | 12/2007 | Mir et al. | |
| 2008/0028100 A1 | 1/2008 | Adelman et al. | |
| 2008/0065655 A1 | 3/2008 | Chakravarthy et al. | |
| 2008/0104063 A1 | 5/2008 | Gallivan et al. | |
| 2008/0104407 A1 | 5/2008 | Horne et al. | |
| 2008/0201580 A1 | 8/2008 | Savitzky et al. | |
| 2008/0208735 A1 | 8/2008 | Balet et al. | |
| 2008/0222706 A1 | 9/2008 | Renaud et al. | |
| 2008/0229422 A1 | 9/2008 | Hudis et al. | |
| 2008/0294663 A1 | 11/2008 | Heinley et al. | |
| 2008/0319991 A1 | 12/2008 | Ross | |
| 2009/0070200 A1 | 3/2009 | August | |
| 2009/0094270 A1 | 4/2009 | Alirez et al. | |
| 2009/0103442 A1 | 4/2009 | Douville | |
| 2009/0157732 A1 | 6/2009 | Hao et al. | |
| 2009/0216738 A1 | 8/2009 | Dexter et al. | |
| 2009/0228701 A1 | 9/2009 | Lin | |
| 2009/0254842 A1 | 10/2009 | Leacock et al. | |
| 2009/0328222 A1 | 12/2009 | Helman et al. | |
| 2010/0005146 A1 | 1/2010 | Drako et al. | |
| 2010/0017360 A1 | 1/2010 | Bansal et al. | |
| 2010/0088158 A1 | 4/2010 | Pollack | |
| 2010/0100957 A1 | 4/2010 | Graham et al. | |
| 2010/0106752 A1 | 4/2010 | Eckardt et al. | |
| 2010/0179831 A1 | 7/2010 | Brown et al. | |
| 2010/0211535 A1 | 8/2010 | Rosenberger | |
| 2011/0060910 A1 | 3/2011 | Gormish et al. | |
| 2011/0131279 A1 | 6/2011 | Karnik et al. | |
| 2011/0202555 A1 | 8/2011 | Cordover et al. | |
| 2011/0202886 A1 * | 8/2011 | Deolalikar ............ | G06F 16/353 715/853 |
| 2011/0238413 A1 | 9/2011 | Wu et al. | |
| 2011/0258272 A1 | 10/2011 | Drako et al. | |
| 2011/0271349 A1 | 11/2011 | Kaplan | |
| 2011/0276638 A1 | 11/2011 | Errico et al. | |
| 2012/0004904 A1 * | 1/2012 | Shin ..................... | G06F 16/35 704/9 |
| 2012/0079592 A1 | 3/2012 | Pandrangi | |
| 2012/0110674 A1 | 5/2012 | Belani et al. | |
| 2012/0158527 A1 | 6/2012 | Cannelongo et al. | |
| 2012/0169593 A1 | 7/2012 | Mak et al. | |
| 2012/0191502 A1 | 7/2012 | Gross | |
| 2012/0191786 A1 | 7/2012 | Downing | |
| 2012/0218305 A1 | 8/2012 | Patterson et al. | |
| 2012/0233145 A1 | 9/2012 | Howes et al. | |
| 2012/0259855 A1 | 10/2012 | Mizuguchi et al. | |
| 2012/0284791 A1 | 11/2012 | Miller et al. | |
| 2013/0019306 A1 | 1/2013 | Lagar-Cavilla et al. | |
| 2013/0046783 A1 | 2/2013 | Zhang et al. | |
| 2013/0097709 A1 | 4/2013 | Basavapatna et al. | |
| 2013/0101159 A1 | 4/2013 | Chao et al. | |
| 2013/0110876 A1 | 5/2013 | Meijer et al. | |
| 2013/0132381 A1 | 5/2013 | Chakrabarti | |
| 2013/0139268 A1 | 5/2013 | An et al. | |
| 2013/0218879 A1 | 8/2013 | Park et al. | |
| 2013/0239217 A1 | 9/2013 | Kindler et al. | |
| 2013/0305149 A1 | 11/2013 | Dimitrov et al. | |
| 2013/0325859 A1 | 12/2013 | Porter | |
| 2013/0332862 A1 | 12/2013 | Mirra et al. | |
| 2013/0339354 A1 * | 12/2013 | Jain ..................... | G06F 16/951 707/737 |
| 2014/0013451 A1 | 1/2014 | Kulka et al. | |

(56) References Cited

U.S. PATENT DOCUMENTS

| | | |
|---|---|---|
| 2014/0059683 A1 | 2/2014 | Ashley |
| 2014/0122456 A1 | 5/2014 | Dies |
| 2014/0122501 A1 | 5/2014 | Shen et al. |
| 2014/0149417 A1 | 5/2014 | Kim |
| 2014/0173712 A1 | 6/2014 | Ferdinand |
| 2014/0173738 A1 | 6/2014 | Condry et al. |
| 2014/0188895 A1 | 7/2014 | Wang et al. |
| 2014/0229422 A1 | 8/2014 | Jain et al. |
| 2014/0280293 A1 | 9/2014 | Scanlon |
| 2014/0283107 A1 | 9/2014 | Walton et al. |
| 2014/0344256 A1 | 11/2014 | Bitincka et al. |
| 2015/0039565 A1 | 2/2015 | Lucas |
| 2015/0081803 A1 | 3/2015 | Dick et al. |
| 2015/0106170 A1 | 4/2015 | Bonica |
| 2015/0128274 A1 | 5/2015 | Giokas |
| 2015/0134599 A1 | 5/2015 | Banerjee et al. |
| 2015/0186532 A1 | 7/2015 | Agarwal et al. |
| 2015/0188715 A1 | 7/2015 | Castelluci et al. |
| 2015/0193529 A1* | 7/2015 | Jo .................. G06Q 30/02 707/722 |
| 2015/0227518 A1 | 8/2015 | Kallan |
| 2015/0229664 A1 | 8/2015 | Hawthorn et al. |
| 2015/0242401 A1 | 8/2015 | Liu |
| 2015/0248563 A1 | 9/2015 | Alfarano et al. |
| 2015/0261847 A1 | 9/2015 | Ducott et al. |
| 2015/0326601 A1 | 11/2015 | Grondin et al. |
| 2015/0370888 A1 | 12/2015 | Fonseca et al. |
| 2015/0378996 A1 | 12/2015 | Kesin et al. |
| 2016/0004864 A1 | 1/2016 | Falk et al. |
| 2016/0028759 A1 | 1/2016 | Visbal |
| 2016/0306965 A1 | 10/2016 | Iyer et al. |
| 2017/0277780 A1 | 9/2017 | Kesin et al. |
| 2018/0101594 A1 | 4/2018 | Chakerian et al. |
| 2019/0108278 A1 | 4/2019 | Kesin et al. |

FOREIGN PATENT DOCUMENTS

| | | |
|---|---|---|
| EP | 1962222 | 8/2008 |
| EP | 2881868 | 6/2015 |
| EP | 2897051 | 7/2015 |
| EP | 2963578 | 1/2016 |
| EP | 2963595 | 1/2016 |
| EP | 2985974 | 2/2016 |
| NL | 2011642 | 8/2015 |
| WO | WO 2005/010685 | 2/2005 |

OTHER PUBLICATIONS

U.S. Pat. No. 10,180,929, Systems and Methods for Identifying Key Phrase Clusters Within Documents, Jan. 15, 2019.

U.S. Pat. No. 9,619,557, Systems and Methods for Key Phrase Characterization of Documents, Apr. 11, 2017.

U.S. Pat. No. 10,162,887, Systems and Methods for Key Phrase Characterization of Documents, Dec. 25, 2018.

U.S. Appl. No. 16/209,617, Systems and Methods for Key Phrase Characterization of Documents, filed Dec. 4, 2018.

Baker et al., "The Development of a Common Enumeration of Vulnerabilities and Exposures," Presented at the Second International Workshop on Recent Advances in Intrusion Detection, Sep. 7-9, 1999, pp. 35.

Bhuyan et al., "Network Anomaly Detection: Methods, Systems and Tools," First Quarter 2014, IEEE, 34 pages.

FireEye, <http://www.fireeye.com/> Printed Jun. 30, 2014 in 2 pages.

Lee et al., "A Data Mining and CIDF Based Approach for Detecting Novel and Distributed Intrusions," Lecture Notes in Computer Science, vol. 1907 Nov. 11, 2000, pp. 49-65.

VirusTotal—About, <http://www.virustotal.com/en/about/> Printed Jun. 30, 2014 in 8 pages.

Zheng et al., "GOEAST: a web-based software toolkit for Gene Ontology enrichment analysis," Nucleic acids research 36.suppl 2 (2008): pp. W385-W363.

* cited by examiner

SYSTEMS AND METHODS FOR IDENTIFYING KEY PHRASE CLUSTERS WITHIN DOCUMENTS

CROSS-REFERENCE TO RELATED APPLICATIONS

This application is a continuation of U.S. patent application Ser. No. 15/293,140, filed Oct. 13, 2016 and titled "SYSTEMS AND METHODS FOR IDENTIFYING KEY PHRASE CLUSTERS WITHIN DOCUMENTS" which is a continuation of U.S. patent application Ser. No. 14/581,920, filed Dec. 23, 2014 and titled "SYSTEMS AND METHODS FOR IDENTIFYING KEY PHRASE CLUSTERS WITHIN DOCUMENTS," which is a continuation-in-part of U.S. patent application Ser. No. 14/319,765, filed Jun. 30, 2014 and titled "SYSTEMS AND METHODS FOR KEY PHRASE CHARACTERIZATION OF DOCUMENTS." The benefit of priority to the filing dates of these applications is hereby claimed under 35 U.S.C. § 120. The subject matter of all of these applications is expressly incorporated herein by reference in their entirety for all purposes.

BACKGROUND

Vast amounts of data are readily available to readers, analysts, and researchers today, on the one hand allowing them to perform more complicated and detailed data analyses than ever, but on the other hand making it more difficult to quickly sort through the data. Automatically characterizing the data in a concise and informative way can help users to identify data that is most relevant for their particular needs. However, characterizing alone may be insufficient to help users quickly sort through the data.

BRIEF DESCRIPTION OF THE DRAWINGS

Reference will now be made to the accompanying drawings, which illustrate exemplary embodiments of the present disclosure. In the drawings.

DETAILED DESCRIPTION

Generally described, aspects of the present disclosure relate to systems and methods that automatically characterize documents by identifying key phrases describing the contents of those documents and by identifying clusters of key phrases. More specifically, the systems and methods can, among other things, obtain a first plurality of documents based at least on a user input; obtain a statistical model based at least on the user input; obtain, from content of the first plurality of documents, a plurality of segments; determine statistical significance of the plurality of segments based at least on the statistical model and the content; determine a representative segment; determine a representative segment for each document; identify a plurality of clusters of representative segments, based at least on the statistical significance and the representative segments; and provide for display a representative cluster from the plurality of clusters, the representative cluster being determined based at least in part on the statistical significance.

According to some embodiments, the operations, techniques, and/or components described herein can be implemented by an electronic device, which can include one or more special-purpose computing devices. The special-purpose computing devices can be hard-wired to perform the operations, techniques, and/or components described herein, or can include digital electronic devices such as one or more application-specific integrated circuits (ASICs) or field programmable gate arrays (FPGAs) that are persistently programmed to perform the operations, techniques and/or components described herein, or can include one or more hardware processors programmed to perform such features of the present disclosure pursuant to program instructions in firmware, memory, other storage, or a combination. Such special-purpose computing devices can also combine custom hard-wired logic, ASICs, or FPGAs with custom programming to accomplish the technique and other features of the present disclosure. The special-purpose computing devices can be desktop computer systems, portable computer systems, handheld devices, networking devices, or any other device that incorporates hard-wired and/or program logic to implement the techniques and other features of the present disclosure.

The one or more special-purpose computing devices can be generally controlled and coordinated by operating system software, such as iOS, Android, Blackberry, Chrome OS, Windows XP, Windows Vista, Windows 7, Windows 8, Windows Server, Windows CE, Unix, Linux, SunOS, Solaris, VxWorks, or other compatible operating systems. In other embodiments, the computing device can be controlled by a proprietary operating system. Operating systems control and schedule computer processes for execution, perform memory management, provide file system, networking, I/O services, and provide a user interface functionality, such as a graphical user interface ("GUI"), among other things.

Figure 1:
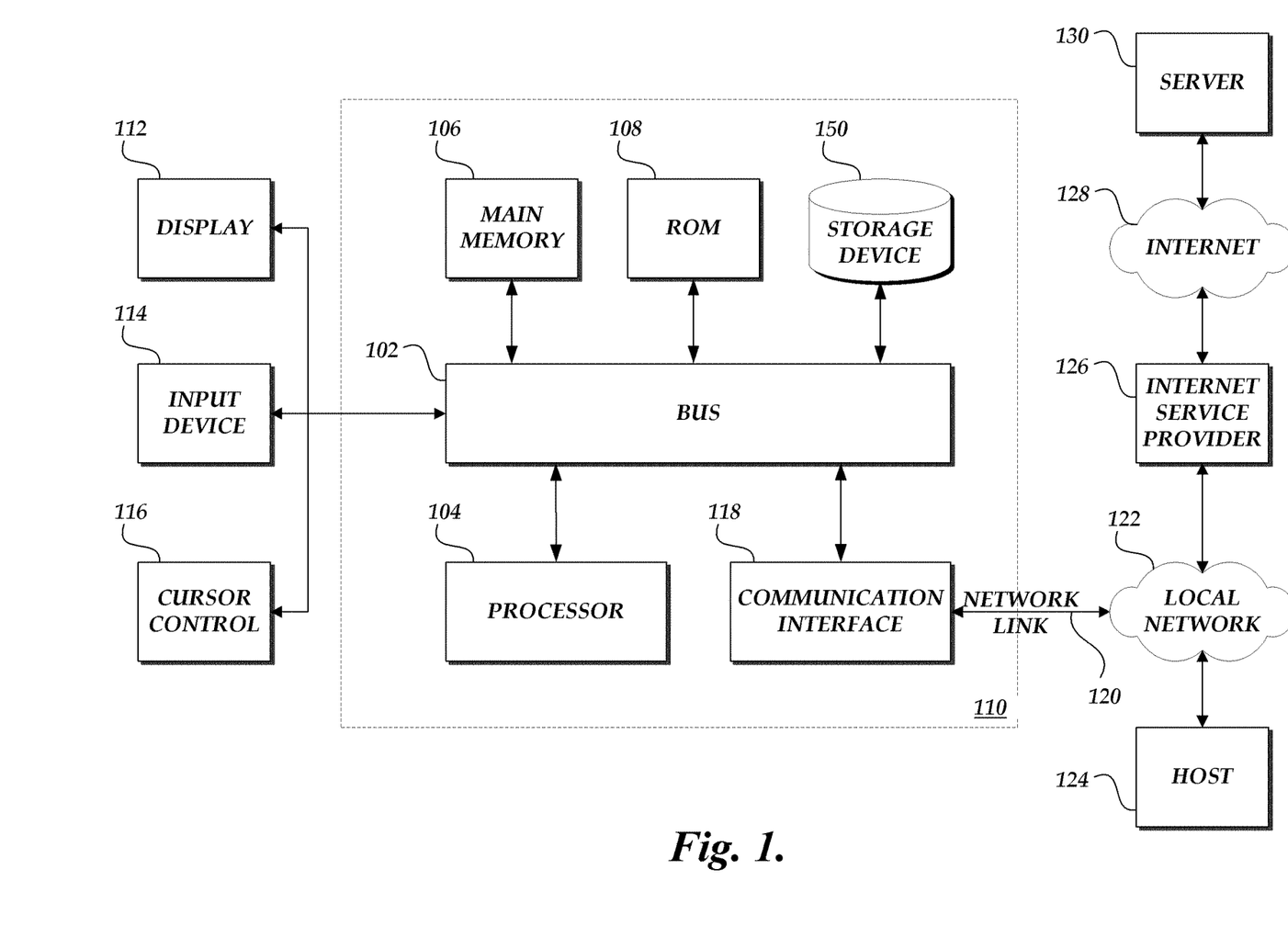
FIG. 1 is a block diagram of an exemplary electronic device, consistent with embodiments of the present disclosure.

By way of example, FIG. 1 is a block diagram that illustrates an implementation of an electronic device 110, which, as described above, can comprise one or more electronic devices. Electronic device 110 includes a bus 102 or other communication mechanism for communicating information, and one or more hardware processors 104, coupled with bus 102 for processing information. One or more hardware processors 104 can be, for example, one or more microprocessors.

Electronic device 110 also includes a main memory 106, such as a random access memory (RAM) or other dynamic storage device, coupled to bus 102 for storing information and instructions to be executed by processor 104. Main memory 106 also can be used for storing temporary variables or other intermediate information during execution of instructions to be executed by processor 104. Such instructions, when stored in non-transitory storage media accessible to one or more processors 104, render electronic device 110 into a special-purpose machine that is customized to perform the operations specified in the instructions.

Electronic device 110 further includes a read only memory (ROM) 108 or other static storage device coupled to bus 102 for storing static information and instructions for processor 104. A storage device 150, such as a magnetic disk, optical disk, or USB thumb drive (Flash drive), etc., is provided and coupled to bus 102 for storing information and instructions.

Electronic device 110 can be coupled via bus 102 to a display 112, such as a cathode ray tube (CRT), an LCD display, or a touchscreen, for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. The input device typically has two degrees of freedom in two axes, a first axis (for example, x) and a second axis (for example, y), that allows the device to specify positions in a plane. In some embodiments, the same direction information and command selections as cursor control may be implemented via receiving touches on a touch screen without a cursor.

Electronic device 110 can include a user interface module to implement a GUI that may be stored in a mass storage device as executable software codes that are executed by the one or more computing devices. This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, Lua, C, and C++. A software module can be compiled and linked into an executable program, installed in a dynamic link library, or written in an interpreted programming language such as, for example, BASIC, Perl, Python, or Ruby. It will be appreciated that software modules can be callable from other modules or from themselves, and/or can be invoked in response to detected events or interrupts. Software modules configured for execution on computing devices can be provided on a computer readable medium, such as a compact disc, digital video disc, flash drive, magnetic disc, or any other tangible medium, or as a digital download (and can be originally stored in a compressed or installable format that requires installation, decompression, or decryption prior to execution). Such software code can be stored, partially or fully, on a memory device of the executing computing device, for execution by the computing device. Software instructions can be embedded in firmware, such as an EPROM. It will be further appreciated that hardware modules can be comprised of connected logic units, such as gates and flip-flops, and/or can be comprised of programmable units, such as programmable gate arrays or processors. The modules or computing device functionality described herein are preferably implemented as software modules, but can be represented in hardware or firmware. Generally, the modules described herein refer to logical modules that may be combined with other modules or divided into sub-modules despite their physical organization or storage.

Electronic device 110 can implement the techniques and other features described herein using customized hard-wired logic, one or more ASICs or FPGAs, firmware and/or program logic which in combination with the electronic device causes or programs electronic device 110 to be a special-purpose machine. According to some embodiments, the techniques and other features described herein are performed by electronic device 110 in response to one or more processors 104 executing one or more sequences of one or more instructions contained in main memory 106. Such instructions can be read into main memory 106 from another storage medium, such as storage device 150. Execution of the sequences of instructions contained in main memory 106 causes processor 104 to perform the process steps described herein. In alternative embodiments, hard-wired circuitry can be used in place of or in combination with software instructions.

The term "non-transitory media" as used herein refers to any media storing data and/or instructions that cause a machine to operate in a specific fashion. Such non-transitory media can comprise non-volatile media and/or volatile media. Non-volatile media includes, for example, optical or magnetic disks, such as storage device 150. Volatile media includes dynamic memory, such as main memory 106. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from, but can be used in conjunction with, transmission media. Transmission media participates in transferring information between storage media. For example, transmission media includes coaxial cables, copper wire, and fiber optics, including the wires that comprise bus 102. Transmission media can also take the form of acoustic or light waves, such as those generated during radio wave and infrared data communications.

Various forms of media can be involved in carrying one or more sequences of one or more instructions to processor 104 for execution. For example, the instructions can initially be carried on a magnetic disk or solid-state drive of a remote computer. The remote computer can load the instructions into its dynamic memory and send the instructions over a telephone line using a modem. A modem local to electronic device 110 can receive the data on the telephone line and use an infrared transmitter to convert the data to an infrared signal. An infrared detector can receive the data carried in the infrared signal and appropriate circuitry can place the data on bus 102. Bus 102 carries the data to main memory 106, from which processor 104 retrieves and executes the instructions. The instructions received by main memory 106 can optionally be stored on storage device 150 either before or after execution by processor 104.

Electronic device 110 also includes a communication interface 118 coupled to bus 102. Communication interface 118 provides a two-way data communication coupling to a network link 120 that is connected to a local network 122. For example, communication interface 118 can be an integrated services digital network (ISDN) card, cable modem, satellite modem, or a modem to provide a data communication connection to a corresponding type of telephone line. As another example, communication interface 118 can be a local area network (LAN) card to provide a data communication connection to a compatible LAN. Wireless links can also be implemented. In any such implementation, communication interface 118 sends and receives electrical, electromagnetic, or optical signals that carry digital data streams representing various types of information.

Network link 120 typically provides data communication through one or more networks to other data devices. For example, network link 120 can provide a connection through local network 122 to a host computer 124 or to data equipment operated by an Internet Service Provider (ISP) 126. ISP 126 in turn provides data communication services through the worldwide packet data communication network now commonly referred to as the "Internet" 128. Local network 122 and Internet 128 both use electrical, electromagnetic, or optical signals that carry digital data streams. The signals through the various networks and the signals on network link 120 and through communication interface 118, which carry the digital data to and from electronic device 110, are example forms of transmission media.

Electronic device 110 can send messages and receive data, including program code, through the network(s), network link 120 and communication interface 118. In the Internet example, a server 130 might transmit a requested code for an application program through Internet 128, ISP 126, local network 122, and communication interface 118.

The received code can be executed by processor 104 as it is received and/or stored in storage device 150 or other non-volatile storage for later execution.

Figure 2:
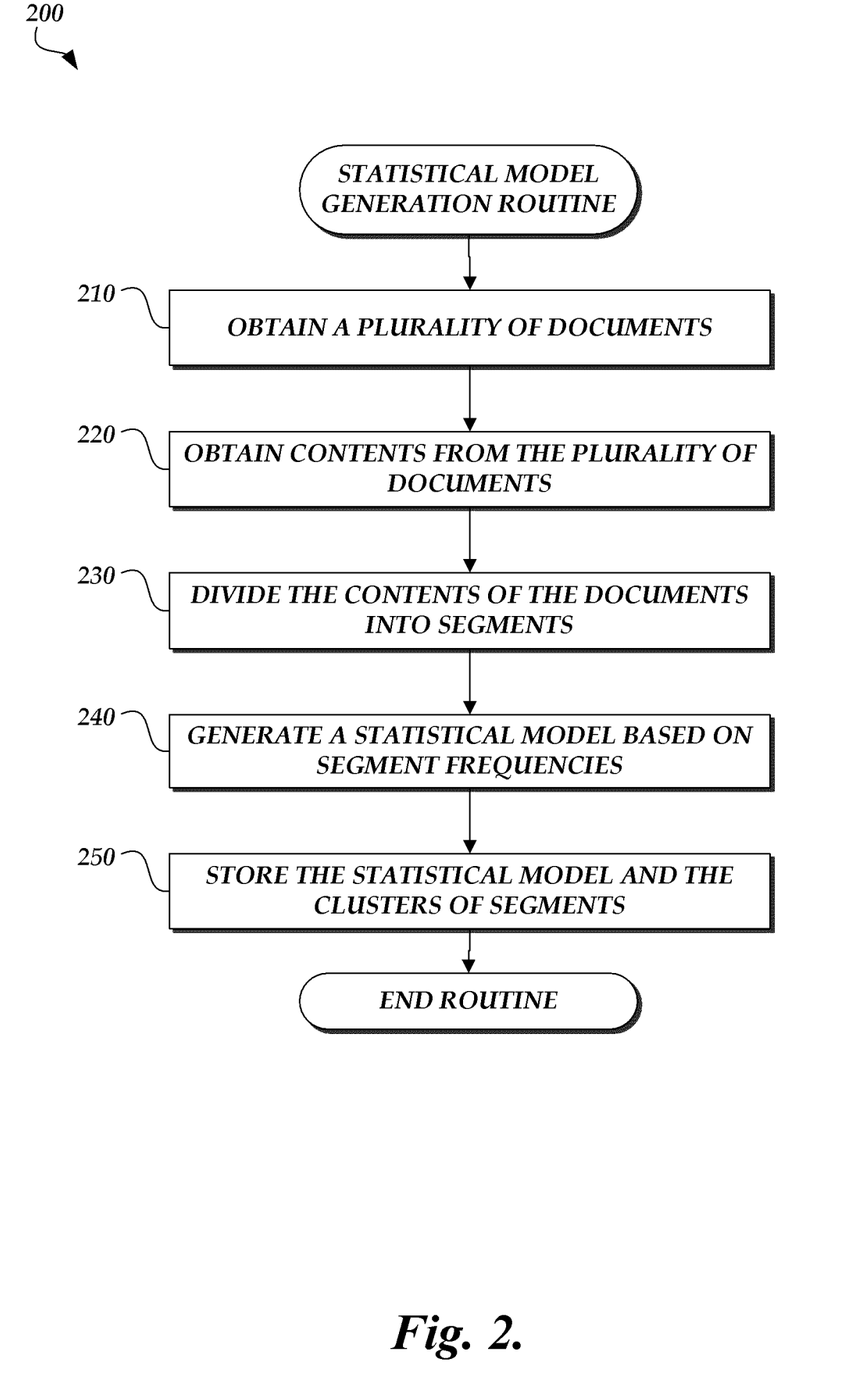
FIG. 2 is a flowchart of an exemplary method for generating a statistical model, consistent with embodiments of the present disclosure.

FIG. 2 shows a flowchart representing an exemplary routine 200 for generating a statistical model representing a plurality of documents. In some embodiments, exemplary routine 200 may be performed by a client application (e.g., a web browser, a plug-in to a web browser, a standalone executable application, etc.) running on a client device, by a server (e.g., a web server), or it can have some blocks executed on the client device and some on the server. Thus, exemplary routine 200 may be performed by one or more electronic devices, such as electronic device 110. And, while exemplary routine 200 and the other embodiments described herein may be performed by multiple electronic devices having one or more processors, for purposes of simplicity and without limitation these embodiments will be explained with respect to a single electronic device (e.g., electronic device 110). While the flowchart discloses the following blocks in a particular order, one skilled in the art will appreciate that at least some of the blocks may, consistent with the teachings of the present disclosure, be moved, modified, or deleted where appropriate.

Referring to FIG. 2 at block 210, the electronic device may obtain a plurality (a corpus) of documents. The electronic device may obtain the documents from one or more databases, which may be stored locally at the electronic device and/or on one or more remote devices. The documents may be of any type of digital format (e.g., HTML, PDF, Microsoft Word, or any other format containing digital text) and may originate from different public or private sources. For example, the documents may originate from Internet web pages, library archives, proprietary subscription-based archives such as IEEE technical articles or Dow Jones's collection of news articles, or any other source of information. The documents may also be obtained by searching the Internet, and may include, for example, some or all search results returned by search engine in response to a user search query. In some embodiments, the documents may be associated with a date, such as the date of publication, the date of the most recent update, and so forth.

In some embodiments, the documents may be associated with entities such as companies or industries. Illustratively, a document may be associated with tags, codes, or other types of metadata describing products, companies, or industries discussed in the documents. For example, a news article discussing a new iPhone® device released by Apple Inc. may be pre-tagged (e.g., automatically or manually by a person) with one or more tags such as "iPhone," "Apple," "AAPL," "consumer electronics," and the like.

With continued reference to FIG. 2 at block 210, the electronic device may, in some embodiments, obtain all documents that are associated with at least one common entity. Illustratively, the electronic device may obtain all documents that are associated with the company Apple Inc. by, for example, obtaining all documents tagged with a tag associated with the company, such as "AAPL," "Apple," "Apple Inc.," etc. The particular common entity may be arbitrarily selected by the user, or can be automatically selected by the electronic device. For example, the electronic device may automatically carry out illustrative routine 200 several times, each time obtaining, at block 210, all documents associated with the next entity from a list of entities.

At block 220, the electronic device may obtain the content of the documents obtained at block 210. In some embodiments, for reasons of performance, the obtained content may include the headlines or titles of the documents, but not the entire text (the body) of the document. In other embodiments, in addition to or instead of the headlines or titles of the documents, the obtained content may include the entire text (the body) of the documents. In yet other embodiments, the obtained content may also contain additional text associated with the documents, such as metadata, user comments, or any other additional text associated with the documents.

At block 230, the electronic device may segment the obtained contents of each document, e.g., by breaking down the contents of each document into segments. Each segment may include, for example, one or more characters, which can include parts of words, single words (e.g., tokens), multiple words (e.g., n-grams), or entire phrases or clauses, such as noun phrases or clauses. For example, if a document's content includes a headline "Apple releases a new iPhone device in October," the electronic device may break this content into single-word segments (or tokens) "Apple," "releases," "a," "new," "iPhone," "device," "in," "October." As another example, the electronic device may break this content into bigram segments, e.g., "Apple releases," "new iPhone," "iPhone device," "in October." As seen in the last example, the electronic device may, in some embodiments, omit some content (e.g., articles, prepositions, etc.), and in some embodiments the same content may be included in more than one token segment (e.g., the word "iPhone" in the above example appears in tokens segments "new iPhone" and "iPhone device").

In some embodiments, before or after breaking the content into segments, the electronic device may also perform various processing of the contents. For example, the electronic device may remove some words from the contents (e.g., articles and prepositions), normalize the contents by reducing each word to its morphological root or lemma, and so forth.

At block 240, the electronic device may generate a statistical model based on the frequencies at which the different segments obtained at block 230 occur within the contents of the documents. For example, the statistical model may contain a number associated with each segment, the number reflecting the number of times the segment was found across all contents of the documents obtained at block 210. In other words, the statistical model may include information reflecting, for various segments, how frequently or rarely that segment is found within the plurality of documents. For example, the model may indicate common English words such as "a," "the," "has," "is," etc., as frequently occurring words. Moreover, if the plurality of documents obtained at block 210 were all associated with a common entity (e.g., "Apple Inc."), the model may indicate the segments related to that entity (e.g., "Apple," "Tim Cook," etc.) as relatively frequent, because these segments are more likely to occur in this plurality of documents than in pluralities of documents that are not necessarily associated with the same common entity.

In some embodiments, the statistical model may store, in addition to the segments and their frequencies, statistical information for sequences of subsequent segments. For example, the statistical model may store frequency information for the segment "new," for the segment "iPhone," and also frequency information of the segment "new" being followed by the segment "iPhone." As discussed above, segments may include more than one word (e.g., bigrams), and therefore in some embodiments the bigram "new iPhone" may be a single segment for which the statistical model calculates an independent frequency.

At block 250, the electronic device may store the statistical model in a data storage, for example, in a volatile memory (e.g., in main memory 106), in a non-volatile memory (e.g., in storage device 150), or in both. In some embodiments, the statistical model may be stored in cache memory to allow quick access and updates.

As discussed above, the electronic device may perform exemplary routine 200 many times, each time for a different plurality of documents. Accordingly, the electronic device can generate and store more than one statistical model. In some embodiments, each statistical model can be associated with a different plurality of documents. For example, if a particular plurality of documents is associated with one or more entities (e.g., with Apple Inc., and/or with the consumer electronics industry) the statistical model generated based on that plurality of documents can be stored in association with those entities. Thus, the electronic device can maintain a set of statistical models, and maintain, for example, a look-up table associating one or more entities with one or more statistical models. Each statistical model can be associated with one or more entities, and each entity can be associated with either exactly one statistical model, or, in some embodiments, more than one statistical model. In some embodiments, the electronic device can store, in addition to or instead of statistical models associated with particular entities, a default statistical model that is not necessarily associated with any particular entity and that was generated, for example, based on all documents available to the electronic device.

Figure 3:
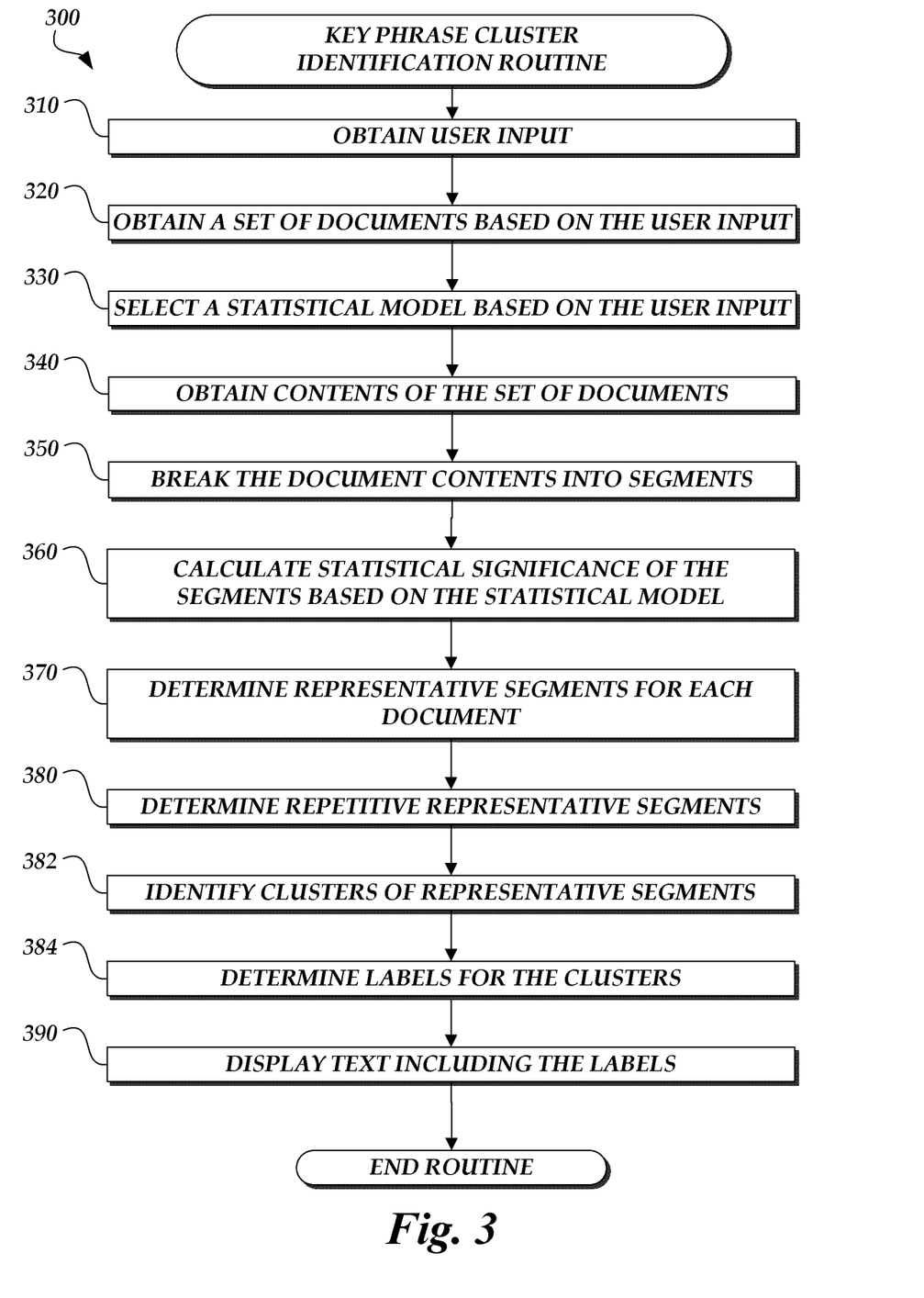
FIG. 3 is a flowchart of an exemplary method for key phrase characterization of documents and identification of key phrase clusters, consistent with embodiments of the present disclosure.

FIG. 3 shows a flowchart representing an exemplary routine 300 for identification of clusters of key phrases within documents. In some embodiments, exemplary routine 300 can be performed by a client application (e.g., a web browser, a plug-in to a web browser, a standalone executable application, etc.) running on a client device, by a server (e.g., a web server), or it can have some steps or parts thereof executed on the client device, and some steps or parts thereof executed on the server. Thus, exemplary routine 300 can be performed by one or more electronic devices, such as electronic device 110. And while exemplary routine 300 and the other following embodiments described herein can be performed by multiple electronic devices each having one or more processors, for purposes of simplicity and without limitation, these embodiments will be explained with respect to a single electronic device (e.g., electronic device 110). While the flowchart discloses the following blocks in a particular order, it is appreciated that at least some of the blocks can be moved, modified, or deleted where appropriate, consistent with the teachings of the present disclosure.

At block 310, the electronic device may obtain a user input. The user input may include any input that identifies or defines, either directly or indirectly, a set of documents that are of interest to the user. User input may also include selection or specification, by the user, of an entity (e.g., a product, a company, an industry, etc.), for example, using that entity's name, symbol, stock ticker, etc. In some embodiments, user input may include selection or specification, by the user, of multiple entities. In some embodiments, user input may also specify desired (or undesired) date ranges, geographical regions, document sizes, document sources, or other types of filters indicating the scope of desired documents. In some embodiments, the user input may include a search query from the user, such as "Apple news for January 2015."

Figure 4A:
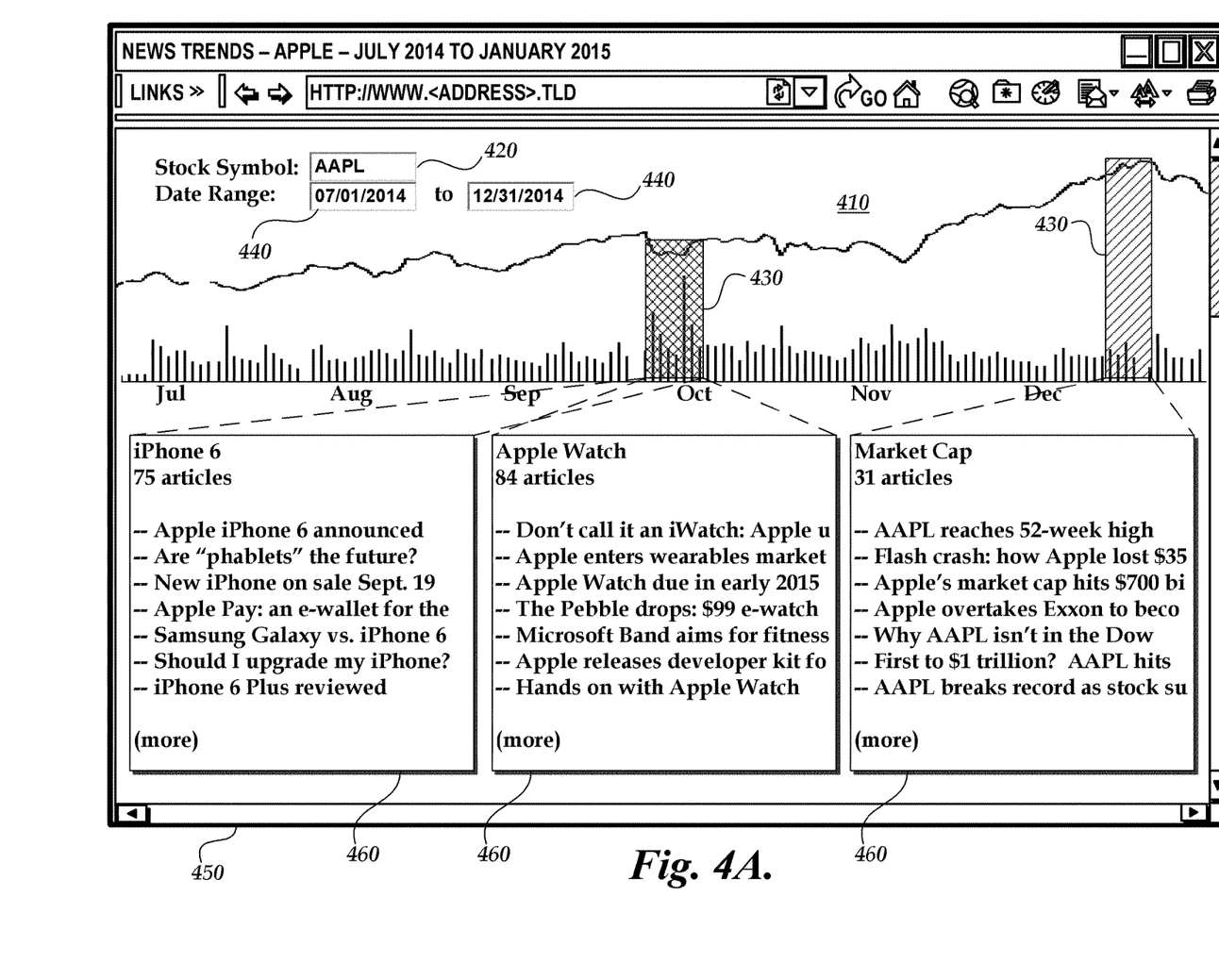
FIGS. 4A-4C illustrate an exemplary display showing exemplary user interactions, consistent with embodiments of the present disclosure.

In some embodiments, as illustrated in FIG. 4A, user input can include selection of a stock symbol 420 and a desired date range 440. In some embodiments, selecting a stock ticker can cause the electronic device to present a stock chart 410 corresponding to the selected stock ticker and showing, for example, changes in stock prices and trading volume. The user can then select the date range directly from the stock chart. For example, the user can identify an unusual spike in stock price or in trading volume and select a date range 430 around that spike.

In some embodiments, the electronic device may initially set the date range to a predetermined date range, and may allow the user to modify it if necessary. For example, the electronic device may preset the date range to include a predetermined number of days, weeks, months, etc., ending with the current date. In some embodiments, the electronic device may preset the date range in accordance with prior date ranges used by the user. In some embodiments, the user may select, instead of whole date ranges, time intervals in resolution of hours, minutes, seconds, etc.

At block 320, the electronic device may obtain a set of one or more documents based on the user input received at block 310. For example, if user input specifies a particular entity (e.g., the company Apple Inc.), the electronic device can obtain, from all the documents available to the electronic device, a set of documents associated with the particular entity, such as a set of documents tagged with a tag "Apple Inc.," "Apple," or "AAPL." If the user input also specifies a date range (e.g., Jul. 1, 2014 to Dec. 31, 2014, as in the example of FIG. 4A), the electronic device may limit the obtained documents only to documents corresponding to (e.g., published on or last updated on) dates that fall within the specified date range. Similarly, the electronic device may limit the scope of the obtained documents based on any other types of filters specified by the user.

In some embodiments, block 310 may be omitted and the electronic device may obtain the set of documents without relying on user input. In some embodiments, when block 310 is omitted, or when it is performed but the user input fails to clearly define the desired scope of documents, the electronic device may obtain a predetermined (e.g., default) set of documents, for example, all documents available to the electronic device.

At block 330, the electronic device may dynamically select a statistical model based on the user input. In some embodiments, the electronic device may select, from a plurality of statistical models, a statistical model that best corresponds to the user input. The plurality of statistical models may be pre-generated, for example, by routine 200, and stored, for example, in a data storage (e.g., cache, volatile, and/or non-volatile memory) accessible by the electronic device.

As discussed above, in some embodiments, each statistical model can correspond to and be stored in association with one or more entities. For example, the electronic device can maintain a look-up table associating one or more entities with one or more statistical models. Accordingly, in some embodiments, if the user input indicates a particular entity, the electronic device can obtain a statistical model that best corresponds to the particular entity, for example, a statistical model that was generated based on a plurality of documents associated with the particular entity. To illustrate, if the user input indicates that the user is interested in documents related to Apple Inc., (e.g., the user inputs a search query "Apple news for January 2015" or selects a stock-price graph corresponding to stock ticker AAPL) the electronic device can automatically obtain a statistical model that was generated based on a plurality of documents tagged with "Apple Inc.," "Apple," or "AAPL." Thus, in some embodiments, the set of documents obtained at block 320 may be a subset of the plurality of documents obtained at block 210 of routine 200, based upon which the statistical model was generated.

In some embodiments, if the electronic device cannot obtain a statistical model that was generated based on a plurality of documents associated with a particular entity specified by the user, the electronic device may obtain, instead, a statistical model that was generated based on a plurality of documents associated with another entity that is related to the particular entity. For example, if the user-specified entity is Apple Inc., and the electronic device cannot obtain a statistical model associated with Apple Inc. (e.g., if it has not been generated or is inaccessible) the electronic device may obtain, instead, a statistical model associated with the consumer electronics industry, because that is an industry associated with Apple Inc. In some embodiments, the electronic device may access a designated database to determine which entities are associated with each other.

Further, if the electronic device cannot obtain a statistical model associated with the user-specified entity, the electronic device may generate such a statistical model (e.g., using routine 200) in real time, after receiving user input at block 310. In some embodiments, the electronic device may generate a new statistical model in real time based on the user input, by using one or more previously generated statistical models. For example, if the documents obtained at block 210 were search results obtained based on a user search query related to more than one distinct concept (e.g., "Apple versus Samsung") the electronic device can generate a new statistical model by merging two previously generated models (e.g., a model associated with Apple, Inc. and a model associated with Samsung Group).

Still further, in some embodiments, if the electronic device cannot obtain a statistical model associated with the user-specified entity, the electronic device can obtain a predetermined (default) statistical model that is not necessarily associated with any particular entity and that was generated, for example, based on all documents available to the electronic device.

While block 330 is listed in the exemplary flowchart of FIG. 3 as being performed before block 340, one skilled in the art will appreciate that block 330 may be performed after block 340, or, generally, at any time before block 360.

At block 340, the electronic device can obtain the contents of the set of documents obtained at block 320. In some embodiments, for reasons of performance, the obtained content may include the headlines or titles of the documents, but not contain the entire text (the body) of the document. In other embodiments, in addition to or instead of the headlines or titles of the documents, the obtained content can include the entire text (the body) of the documents. In yet other embodiments, the obtained content can also contain additional text associated with the documents, such as metadata, user comments, or any other additional text associated with the documents.

At block 350, the electronic device can segment the contents of the set of documents, e.g., break down the contents of each document into segments. Each segment can include one or more characters, which can include parts of words, single words (e.g., tokens), multiple words (e.g., n-grams), or entire phrases or clauses, such as noun phrases or clauses. For example, if document's content includes a headline "Apple releases a new iPhone device in October," the electronic device can break this content into single-word segments "Apple," "releases," "a," "new," "iPhone," "device," "in," "October." As another example, the electronic device can break this content into bigram segments, e.g., "Apple releases," "new iPhone," "iPhone device," "in October." As seen from the last example, the electronic device can, in some embodiments, omit some content (e.g., articles, prepositions, etc.), and in some embodiments the same content can be included in more than one token segment (e.g., the word "iPhone" in the above example appears in segments "new iPhone" and "iPhone device").

In some embodiments, before or after breaking the content into segments, the electronic device can also perform various processing of the contents. For example, the electronic device can remove some words from the contents (e.g., articles and prepositions), normalize the contents by reducing each word to its morphological root or lemma, and so forth.

While blocks 340 and 350 of routine 300 for identification of clusters of key phrases within documents may be the same as or similar to blocks 220 and 230 of routine 200 for generating a statistical model, respectively, it is appreciated that blocks 340 and 350 do not have to be same as or similar to blocks 220 and 230, respectively. In some embodiments, however, to achieve better results in terms of quality and/or performance, the electronic device can chose to use the same segmentation and processing methods at block 350 as the segmentation and processing methods carried out at block 220.

At block 360, the electronic device may calculate the statistical significance of the tokens segments obtained at block 350 based on the statistical model obtained at block 330. In some embodiments, the electronic device calculates the statistical significance of a segment by comparing the frequency with which the segment occurred in a particular document (or a set of documents) with the frequency of the segment as indicated in the statistical model. Because the statistical model may be generated based on a large corpus of documents, it can serve as an estimation of a typical or average frequency of a given segment within that corpus. Accordingly, by comparing the frequency of a given segment within a particular document to its frequency in the statistical model, the electronic device may determine whether the segment's frequency in the particular document is higher than average, which may be a good indication that the particular document is specifically directed to the concept or the subject matter described by the segment. For example, a segment "new iPhone" may have a frequency A in the particular document and a frequency B in the statistical model. If frequency A is higher than frequency B (e.g., higher by a predetermined threshold)—i.e., the particular document mentions the term "new iPhone" more often than usual—the electronic device may determine that the segment is statistically significant, meaning that there is high likelihood that the particular document discusses a new iPhone® or some other closely related subject matter.

In some embodiments, the electronic device may calculate a statistical significance value for each segment obtained from the contents of a given document, where the calculation is based at least on the segment's frequency within the contents of the given document and the segment's frequency in the statistical model obtained based on user input in block 330. For example, the statistical significance value can be directly proportional to the segment's frequency within the contents of the given document and inversely proportional to the segment's frequency in the statistical model.

At block 370, the electronic device may determine one or more representative segments for each of the set of documents obtained at block 320. For example, the electronic device may determine, for each document, N segments having the highest statistically significant values among segments of that document's contents, where N is a positive integer. As discussed above, segments having higher statistical significance values are more likely to represent or correspond to the subject matter discussed in the document.

At block 380, the electronic device may determine, among all the representative segments obtained for the set of documents, one or more repetitive representative segments. For example, the electronic device may identify one or more groups of M or more identical or substantially identical representative segments, where M is a predetermined threshold that can be an integer greater or equal to two. For example, if the set of documents obtained at block 320 includes a thousand documents, and M=20, the electronic device may identify any groups of twenty or more documents having identical or substantially identical representative segments. In some embodiments, two segments may be considered substantially identical if the edit distance (e.g., Levenshtein distance) between them is small, e.g., lower than a predetermined threshold, and/or when the segments are synonyms of each other. For example, the electronic device may determine that the segments "health tracker" and "fitness tracker" are substantially identical. Repetitive representative segments can indicate an important subject or event, such as a news event, that is described in multiple documents, such as multiple news sources.

In some embodiments, block 380 can be omitted, and each representative segment can be considered as a repetitive representative segment for the purposes of the following discussion.

At block 382, the electronic device may identify clusters of representative segments within the set of documents obtained at block 320. In some embodiments, the electronic device may identify clusters using the representative segments determined at block 370, and may treat the repetitive representative segments identified at block 380 as substantially identical. For example, the electronic device may identify a cluster of documents having the representative segments "iPhone 6," "new iPhone," and any variation on "bigger screen" (e.g., "larger screens," "bigger display," etc.). The electronic device may identify clusters by, for example, analyzing the frequencies of segments in documents whose representative segment is "iPhone 6" and comparing to the frequencies of segments in documents whose representative segment is "new iPhone." In an alternative embodiment, the electronic device may identify clusters of segments without reference to a document's representative segment. For example, the electronic device may identify as a cluster those documents containing at least three of the segments "Apple Watch," "wearable," "health," and "fitness," regardless of the representative segments for these documents. Further, the electronic device may identify clusters by analyzing the absence of segments. For example, the electronic device may identify a cluster of documents having the segments "Apple," "iPhone," "Touch ID," and "sapphire," but not "GT Advanced," "factory," or "bankruptcy."

Subsequently, at block 384, the electronic device may determine labels for the clusters. For example, the electronic device may determine that the label "Apple Watch" represents a cluster of documents having the representative segments "Apple Watch," "wearable computing," and "health monitor." The electronic device may determine a label by comparing segments, frequencies of segments, representative segments, repetitive segments, or by using the statistical model obtained at block 330. For example, the statistical model may indicate that the segment "iPhone 6 Plus" appears more frequently than any other segment in a cluster of documents with representative segments "phablet," "high definition video," and "iPhone 6 Plus." The electronic device may therefore determine that the label "iPhone 6 Plus" represents the cluster. In some embodiments, the electronic device may determine a label that includes one or more segments. For example, the electronic device may determine that the label "Apple market cap" represents a cluster of documents with representative segments "AAPL," "market cap," and "52-week high."

Figure 4B:
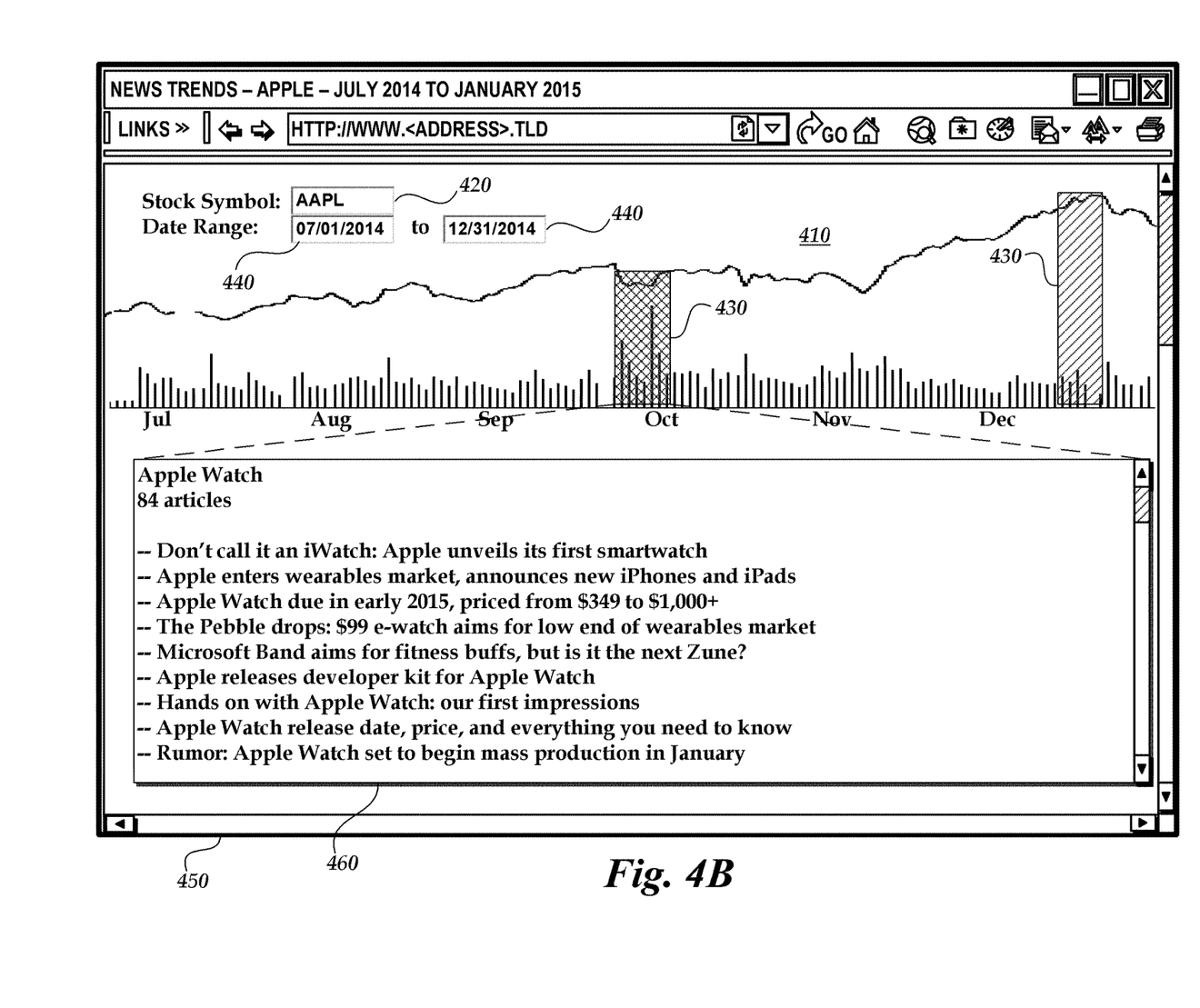

At block 390, the electronic device can display (e.g., on display 112) or provide for display the labels determined at block 384. For instance, in the example illustrated in FIG. 4A, the electronic device determines and displays in window 450 three clusters of documents 460 labeled "iPhone 6," "Apple Watch," and "Market Cap." In some embodiments, as illustrated in FIGS. 4A and 4B, the electronic device can also allow the user to select one of the labels (e.g., "Apple Watch") and, responsive to the user's selection, display (e.g., in an expanded window 460) the contents of and/or links to the documents in the selected cluster.

Figure 4C:
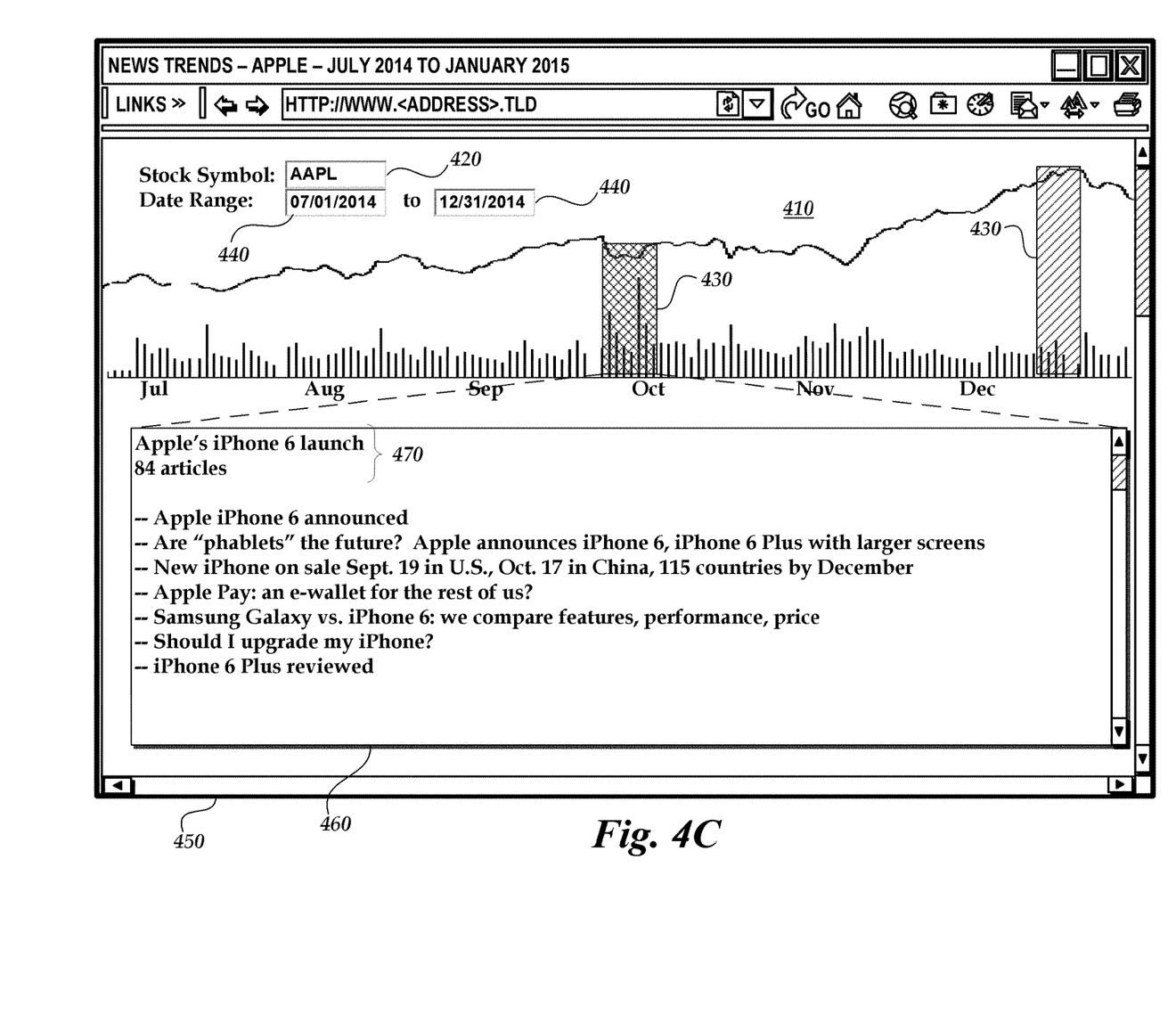

In some embodiments, to provide additional context to the segments and thereby improve readability, the electronic device can display or provide for display at block 390 a key phrase that includes the label. The key phrase can include, for example, a complete sentence, a noun phrase, a verb phrase, or any other meaningful combination of words. The key phrase can be obtained by the electronic device, for example, from the contents of one of the documents having the label. For example, if the label "iPhone 6" appeared in one of the documents (represented by the label) as part of the phrase "AT&T stores getting ready for Apple's iPhone 6 launch," the electronic device can display or provide for display (e.g., in header 470) the key phrase "Apple's iPhone 6 launch," as illustrated in FIG. 4C.

In some embodiments, if the key phrase or phrases corresponding to the label are different in different documents represented by the label, the electronic device can select, among the different key phrases, an "average" key phrase, i.e., the key phrase that is most similar to the other key phrases, as measured based on edit distance, based on the number of common words contained in the phrase, or any other suitable algorithm.

Allowing the user to select a particular date range, for example, around unusual changes in stock price or trading volume, and displaying labels representing the documents (e.g., news articles) within that date range, allows the user to quickly determine which events may have caused the unusual changes.

Embodiments of the present disclosure have been described herein with reference to numerous specific details that can vary from implementation to implementation. Certain adaptations and modifications of the described embodiments can be made. Other embodiments can be apparent to those skilled in the art from consideration of the specification and practice of the embodiments disclosed herein. It is intended that the specification and examples be considered as exemplary only, with a true scope and spirit of the present disclosure being indicated by the following claims. It is also intended that the sequence of steps shown in figures are only for illustrative purposes and are not intended to be limited to any particular sequence of steps. As such, it is appreciated that these steps can be performed in a different order while implementing the exemplary methods or processes disclosed herein.

What is claimed is:

1. A computing system comprising:
computer-readable storage media storing instructions; and
one or more processors configured to execute the instructions to cause the computing system to:
obtain documents and a statistical model;
segment contents of the documents into segments;
determine statistical significances of the segments using the statistical model;
select, for each of the documents, a representative segment from the segments based on the determined statistical significances of the segments;
cluster the documents into clusters based at least in part on the representative segment selected for each document;
determine a label for each cluster;
identify a set of clusters, from the clusters, based on a user input, wherein the set of clusters includes a plurality of clusters, wherein the user input comprises at least one of: a string or a date range, and wherein the user input is related to the set of clusters; and
modify a graphical user interface to further include, for each of the clusters of the set of clusters:
an indication of the label associated with the cluster, and
an indication of the documents associated with the cluster;
wherein the clusters of the set of clusters and their respective associated documents are grouped and displayed in separate portions of the graphical user interface.

2. The computing system of claim 1, wherein the selecting of the representative segment further comprises, for each of the documents, determining a quantity of the segments having the highest statistical significance values from among the segments of the document.

3. The computing system of claim 1, wherein the documents are clustered into the clusters further based on identical or substantially identical representative segments.

4. The computing system of claim 1, wherein the one or more processors configured to execute the instructions to cause the computing system to determine identical or substantially identical representatives segments based on at least one of an edit distance or a synonym.

5. The computing system of claim 4, wherein the one or more processors configured to execute the instructions to cause the computing system to determine the identical or substantially identical representatives segments based on the edit distance that is based on a Levenshtein distance.

6. The computing system of claim 1, wherein determining the label for each cluster further comprises determining the representative segment appearing most frequently in the cluster.

7. The computing system of claim 1, wherein determining the label for each cluster further comprises determining a textual phrase different from the representative segments for the cluster.

8. The computing system of claim 7, wherein the textual phrase is based in part on one or more of the representative segments for the cluster.

9. The computing system of claim 1, wherein the user input comprises a date or date range.

10. The computing system of claim 1, wherein the indication of the documents associated with the cluster includes contents of the documents, links to the documents, or a combination thereof.

11. A method performed by one or more processors, the method comprising:
obtaining documents and a statistical model;
segmenting contents of the documents into segments;
determining statistical significances of the segments using the statistical model;
selecting, for each of the documents, a representative segment from the segments based on the determined statistical significances of the segments;
clustering the documents into clusters based at least in part on the representative segment selected for each document;
determining a label for each cluster;
identifying a set of clusters, from the clusters, based on a user input, wherein the set of clusters includes a plurality of clusters, wherein the user input comprises at least one of: a string or a date range, and wherein the user input is related to the set of clusters; and
modifying a graphical user interface to further include, for each of the clusters of the set of clusters:
an indication of the label associated with the cluster, and
an indication of the documents associated with the cluster;
wherein the clusters of the set of clusters and their respective associated documents are grouped and displayed in separate portions of the graphical user interface.

12. The method of claim 11, wherein the representative segment selected for each document is selected based at least in part on identical or substantially identical representative segments.

13. The method of claim 11, wherein the representative segment selected for each document is selected based at least in part on synonym relationships between representative segments.

14. The method of claim 11, wherein the representative segment selected for each document is selected based at least in part on an edit distance.

15. The method of claim 14, wherein the edit distance is based on a Levenshtein distance.

16. The method of claim 11, wherein determining the label for each cluster further comprises determining the representative segment appearing most frequently in the cluster.

17. The method of claim 11, wherein determining the label for each cluster further comprises determining a textual phrase that is different from the representative segments in each cluster.

18. The method of claim 17, wherein the textual phrase is based in part on one or more of the representative segments for one or more of the clusters.

19. The method of claim 11, wherein the user input selects a date or date range.

20. The method of claim 11, wherein the indications of the documents associated with the cluster includes contents of the documents, links to the documents, or a combination thereof.

* * * * *